United States Patent
Mitogo

(10) Patent No.: US 11,094,183 B1
(45) Date of Patent: Aug. 17, 2021

(54) REX COOLING MASTER

(71) Applicant: Donaldo Rex Mitogo, Providence, RI (US)

(72) Inventor: Donaldo Rex Mitogo, Providence, RI (US)

( * ) Notice: Subject to any disclaimer, the term of this patent is extended or adjusted under 35 U.S.C. 154(b) by 0 days.

(21) Appl. No.: 16/873,719

(22) Filed: Jun. 12, 2020

(51) Int. Cl.
| | |
|---|---|
| *G08B 21/22* | (2006.01) |
| *G08B 21/02* | (2006.01) |
| *G08B 21/24* | (2006.01) |
| *B60H 1/00* | (2006.01) |

(52) U.S. Cl.
CPC ......... *G08B 21/22* (2013.01); *B60H 1/00742* (2013.01); *G08B 21/02* (2013.01); *G08B 21/24* (2013.01)

(58) Field of Classification Search
None
See application file for complete search history.

(56) References Cited

U.S. PATENT DOCUMENTS

| | | | | |
|---|---|---|---|---|
| 7,984,860 B2* | 7/2011 | Liao | ......................... | F24F 11/30 236/46 R |
| 8,768,292 B2* | 7/2014 | Welch | .................. | H04W 4/029 455/404.2 |
| 8,827,171 B2* | 9/2014 | Choi | .................. | B60H 1/00778 236/51 |
| 8,884,748 B2* | 11/2014 | Qian | ..................... | G08B 21/22 340/438 |
| 9,227,484 B1* | 1/2016 | Justice | ............... | B60H 1/00742 |
| 9,507,413 B2* | 11/2016 | Gee | ......................... | B60K 37/06 |
| 9,758,016 B1* | 9/2017 | Baron | ......................... | B60J 1/17 |
| 9,796,371 B2* | 10/2017 | Soifer | ................ | B60H 1/00742 |
| 9,953,230 B2* | 4/2018 | Nicol | .................. | G06K 9/00838 |
| 10,000,961 B2* | 6/2018 | Elie | ........................ | E05F 15/611 |
| 10,131,300 B2* | 11/2018 | Mullett | ................. | B60R 16/037 |
| 10,713,917 B1* | 7/2020 | Wellington | ........ | G06K 9/00838 |
| 2009/0146813 A1* | 6/2009 | Nuno | ...................... | G08B 21/22 340/572.1 |
| 2016/0042624 A1* | 2/2016 | Quave | ................ | B60H 1/00778 340/457 |
| 2016/0103111 A1* | 4/2016 | Griffin | .................. | B60N 2/002 73/25.01 |
| 2016/0200169 A1* | 7/2016 | Tjahjono | ............ | B60H 1/00778 701/45 |
| 2017/0190233 A1* | 7/2017 | Wittliff, III | ............ | B60N 2/002 |
| 2017/0240022 A1* | 8/2017 | Ireri | ................... | B60H 1/00778 |

(Continued)

*Primary Examiner* — Muhammad Adnan

(57) ABSTRACT

The Rex Cooling Master is a multi-components advanced technology device Created to eliminate vehicular heatstroke or any other potential death related to intense temperatures in vehicles.
The cooling Master uses its multiple components in effort to alter the vehicle's climate system, it keeps a steady cooling temperature and uses other features to ensure the safety of the passengers, especially for children, and pets. The device is composed in five (5) components:
A) Base: Connected to the vehicle, and receives info-signals from other components and carries-out commands. B) Sensors & cameras: scans for sound waves and visual movements, then sends the data to the base. C) Portable controller: receives notifications and sends commands to the base. D) Screen monitor: home emergency controller, sends commands to the base. E) Wireless connection: ensures permanent connectivity between components and sends commands to the base.

1 Claim, 2 Drawing Sheets

(56) References Cited

U.S. PATENT DOCUMENTS

| | | | |
|---|---|---|---|
| 2018/0126872 A1* | 5/2018 | Folino | G08B 21/24 |
| 2018/0370431 A1* | 12/2018 | Wincek | G01V 3/088 |
| 2019/0077217 A1* | 3/2019 | Yu | B60H 1/0073 |
| 2019/0215672 A1* | 7/2019 | Orris | B60N 2/28 |
| 2020/0001715 A1* | 1/2020 | Brown | B60Q 1/50 |
| 2020/0193792 A1* | 6/2020 | Mao | G10L 13/00 |
| 2020/0256112 A1* | 8/2020 | Williams | E05F 15/71 |
| 2020/0282803 A1* | 9/2020 | Upmanue | B60H 1/00878 |
| 2020/0353940 A1* | 11/2020 | Kim | B60H 1/00978 |

* cited by examiner

REX COOLING MASTER

BACKGROUND OF THE INVENTION

Field of Invention

The Rex Cooling Master is a cutting-edged technological machine designed to protect and save children and pets against excessive temperatures in a vehicle. The purpose of this device is to prevent children and pets against sweltering heat or freezing cold conditions via a system of image scanning, sound detector, and temperature stimulations. The device uses the sensors to scan the entire car looking for children, pets, or any other person left behind. Significantly, if a child or pet is detected inside of the vehicle by themselves, the Rex Cooling Master then uses a private network connection that sends five (5) alert messages to the driver, if the driver fails to respond to the alert system. The device will execute another command and then it connects with the additional emergency contacts that are saved in the device's software. The Rex Cooling Master is a nonobvious device uniquely crafted to serve many different purposes but to all which are part of basic life necessities. The device comes equipped with supreme micro-sensors embedded with ultra-sensitive mini cameras: the sensors are activated once the driver exits the vehicle and the door is locked. The sensors use air pressure and radio waves technology to detect any movement, noise, or motion in the car. The mini-cameras also serve as an additional support system by scanning images and reporting the digital information to the device's software for further instructions. Within the same device, you will find the advanced Silicon Chip: one of the world's most available substances, wildly abundant in all parts of the world and extraordinarily efficient. Silicon Chips are capable of executing thousands if not millions of commands at the same time. And this Silicon chip is the heart of the device. The Rex Cooling Master is operating by a silicon chip which gives the invention an environment friendly and extremely cheap to make. Also, for better safety and uninterrupted communication, The Rex Cooling Master uses a private secure wireless network backed by multiple firewalls to ensure safety and privacy. The device carries additional built-in battery to secure the never-ending protection.

BRIEF SUMMARY OF THE INVENTION

How Does It Work

For the criticality of this innovation, it is imperative that the device performs the following functions, component "A" is attached to the vehicle's computer system. Component "B" is also installed, sensors placed under each seat with micro-cameras facing the rear-seats. The sensors use density or air pressure (weight of a person per seat) to detect if a person has sat or got-up from the seat. Sound detector system is also in use to further enhance this technology. If the driver's sensor goes off, component "B", sends a signal to component "A", component "A" then replies back with a command to activate the cameras and keep a steady climate control. Once cameras are activated, if a child or pet is detected, component "B" sends another signal to component "A", component "A" then sends two extra commands, the first command goes back to component "B", component "B" uses its digital thermostat to forecast environment condition, if the inside of the vehicle's hot it then raises the air conditioner, if the inside of the vehicle's cold, it then raises the heater. The second command goes to component "C", in a form of emergency alert that a child or pet has been detected in the vehicle alone. If the driver fails to respond to the alert, component "C" then sends another signal to component "A", which will then send another command to component "D". all connected via wireless connection or component "E".

Executive Summary

The device uses several important components to perform and execute all of its programmed commands. The first ($1^{st}$) component "A", is the "base" which carries all the programming and it is the component that receives digital signals from other components. The second ($2^{nd}$) component "B", is the "sensors with embedded mini cameras", which is easily installed in various parts of the vehicle to ensure maximum surveillance/safety scanner, this component job is to report to the "base" which executes the appropriate command. The third ($3^{rd}$) component "C", is a portable controller, it is used to program, control, send, and received alerts and notifications form the "base". The fourth ($4^{th}$) component "D", is a home screen monitor, designed for the stay-at-home parent or other emergency contacts that can quickly access the "base" if the driver fails to respond to the previous emergency alerts. The screen monitor serves as a second emergency controller. The fifth ($5^{th}$) component "E", is the wireless connectivity that connects all of the components in a single network.

DRAWING DESCRIPTION

Brief Description of the Drawings

As described above, all components of this device are comprised of Silicon chips and batteries, FIG. 1, showcases the technology, operation control of the device, and all of its components. FIG. 1, shows the inside technology of each component; including specific parts and named details of each part and functions of the component. While In FIG. 1, you will find, the complete set of the components that consist one device. In FIG. 1, you will find Component "A" Base; which is the component that connects to the vehicle's computer and initiates all of the programs and controls. Component "A" the base; is the component that receives all of the digital signals from other components and diagnoses the system and runs the vehicle's computer system, including the climate control and other features. In FIG. 1, you will also find, Component "B" Scanner; the scanner is the small component that contains the mini camera, sensors, Silicon chip, and battery. Component "C" Portable controller; the portable controller is the component that communicates between the device and the driver/owner/user; the portable controller also serves as the remote of the device and the component to which emergency alerts are sent to for the driver/owner/user to review and respond. Component "D" Home monitor; the home monitor is the second and the largest controller; it functions just like the "portable controller", the only difference is that the home monitor usually sits at home for review and backup emergency responses. Component "E" Private network; the private network is the secure and privacy wireless connectivity that the device runs with, to ensure security and promote private data protection.

Figure 1:
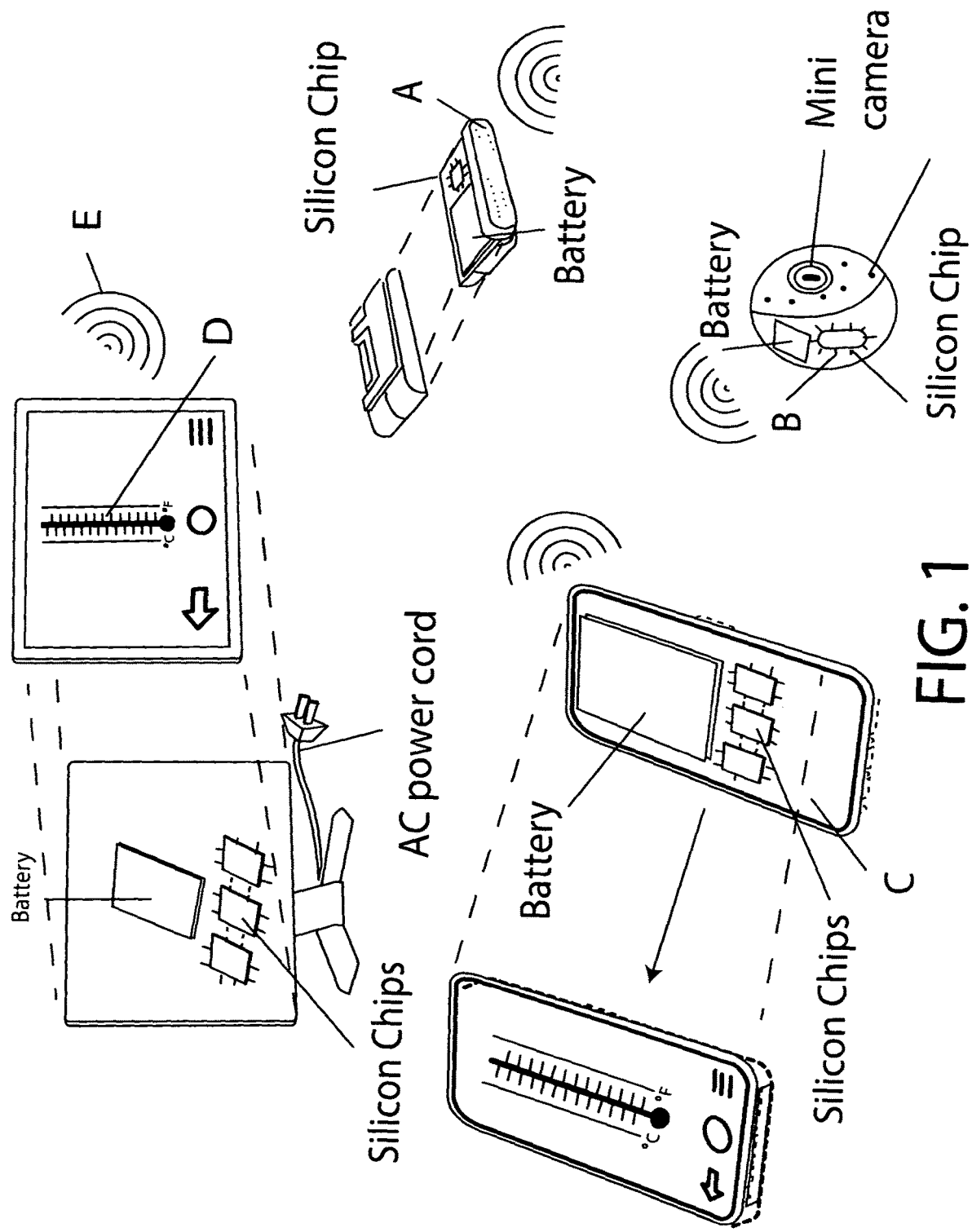
Figure 2:
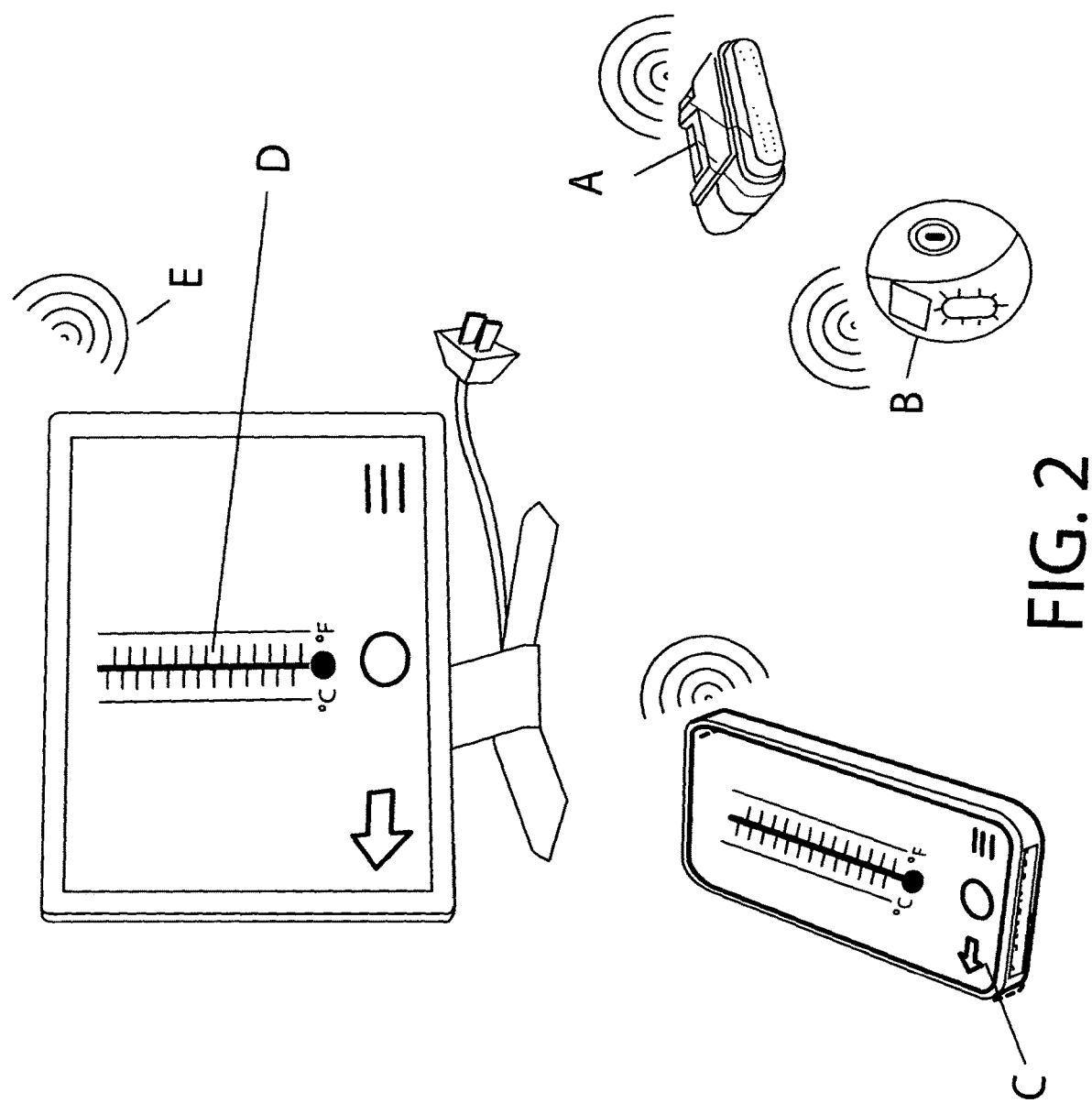
FIG. 2, shows the complete view of the components.

The invention claimed is:
1. A method for protecting a child or a pet left alone in a vehicle, the method comprising:

detecting a driver exit, from the vehicle, and door lock actuation;

upon detection of the driver exit and the door lock actuation, activating one or more sensors, utilizing air pressure and radio waves, and one or more cameras located inside the vehicle, wherein the one or more cameras is a standalone device comprising its own controller and battery;

upon activation of the one or more sensors and the one or more cameras, sensing movements inside the vehicle using the one or more sensors and the one or more camera;

determine presence of a child or a pet inside the vehicle based on the sensed movements;

upon determination of the presence of the child or the pet inside the vehicle, overriding vehicle computer system to turn on air conditioning system to adjust inside temperature to a comfortable level for avoiding excessive heat or freezing temperature for the child or the pet, wherein the comfortable level is an emergency temperature which is previously stored by the driver of the vehicle;

determining, by a temperature sensor, that the air conditioning system is not working properly after the air conditioning system is turned on;

upon determination, by the temperature sensor, that the air conditioning system is not working properly, automatically lower windows of the vehicle to a predetermined level, wherein the predetermined level is an emergency level which is previously stored by the driver of the vehicle;

simultaneously sending five alert messages to a portable cellular phone of the driver while the vehicle computer system is being overridden and the windows are being lowered;

if the driver fails to respond to the alert messages, contacting one or more previously stored emergency contacts.

* * * * *